United States Patent [19]
Jones et al.

[11] Patent Number: 5,096,959
[45] Date of Patent: Mar. 17, 1992

[54] HYDROLYSIS RESISTANT ALKYL RESIN COATING COMPOSITION

[75] Inventors: Lonnie S. Jones, Minneapolis; Donald W. Boespflug, Lino Lakes; Philip J. Ruhoff, Minneapolis, all of Minn.

[73] Assignee: The Valspar Corporation, Minneapolis, Minn.

[21] Appl. No.: 609,024

[22] Filed: Oct. 30, 1990

Related U.S. Application Data

[63] Continuation of Ser. No. 488,875, Mar. 6, 1990, abandoned.

[51] Int. Cl.$^5$ .............................................. C08L 67/08
[52] U.S. Cl. .................................... 524/600; 524/601; 525/437; 525/444; 525/444.5; 528/272; 528/274
[58] Field of Search ............... 524/600, 601; 525/437, 525/444, 444.5; 528/272, 274

[56] References Cited

U.S. PATENT DOCUMENTS

| | | | |
|---|---|---|---|
| 4,172,822 | 10/1979 | Patzschke | 524/539 |
| 4,179,420 | 12/1979 | Laganis | 524/598 |
| 4,220,568 | 9/1980 | Patzschke | 523/501 |
| 4,447,567 | 5/1984 | Geerdes et al. | 523/501 |

OTHER PUBLICATIONS

Jones et al. "Hydrolytic Stability of Oligoesters in Simulated Water-Reducible Coating Formulations", J. of Coating Tech., vol. 57:723, 4/1985; pp. 35-42.

Primary Examiner—John Kight, III
Assistant Examiner—Sam A. Acquah
Attorney, Agent, or Firm—James R. Haller; Gregory P. Kaihoi; Edward S. Hotchkiss

[57] ABSTRACT

Base alkyd resins are modified to provided increased hydrolytic stability by reacting them with a polybasic acid composition containing one or more cycloaliphatic polybasic acids, the resulting modified alkyd having an acid number in the range of 25-100 and having pendent carboxy-functional monoester groups derived from the cycloaliphatic polybasic acids.

15 Claims, 2 Drawing Sheets

HYDROLYSIS RESISTANT ALKYL RESIN COATING COMPOSITION

This application is a continuation of application Ser. No. 488,875, filed Mar. 6, 1990, now abandoned.

BACKGROUND OF THE INVENTION

Alkyd resins have long been used as ingredients in coating compositions that are applied to various materials. For example, cured films resulting from aqueous alkyd coating compositions may be used as protective paint coatings for farm implements. The coating compositions generally comprise an alkyd resin that is dissolved or dispersed in an aqueous medium. Such compositions may include inert fillers, pigments, anticorrosive agents, drying agents, and the like.

Alkyd resins generally are formed by the polymerization of polyols and polybasic acids in an esterification reaction; included in the reaction mixture may be monobasic acids, fatty acids and the like. The aqueous coating compositions formed from such alkyd resins often may exhibit poor hydrolytic stability; that is, the aqueous resin compositions often do not have the capacity to withstand storage at high summertime storage temperatures normally found in warehouse and manufacturing facilities for long periods of time. Hydrolysis of the alkyd may result in separation of the coating composition into phases, accompanied often by settling of solid materials to the bottom or substantial reductions in viscosity and diminished performance of the coating material.

SUMMARY OF THE INVENTION

We have now found that the hydrolytic stability of aqueous alkyd resin compositions can be improved by reacting with the base alkyd commonly used for such compositions a polybasic acid composition comprising one or more cycloaliphatic polycarboxylic acids.

Thus, in one embodiment, the invention relates to a coating composition comprising, in an aqueous medium, a modified alkyd resin which is the reaction product of a hydroxyl functional base alkyd preferably having a hydroxyl number of at least 20 with a sufficient amount of a polybasic acid composition comprising one or more cycloaliphatic polycarboxylic acids to provide the modified alkyd with an acid number in the range of 25 to 100, more preferably 30–50, and most desirably 35–40, the modified alkyd having pendent groups which are carboxyl functional monoesters of the cycloaliphatic polybasic acid. Desirably, the polybasic acid composition comprises as its major and preferably its sole ingredient, 1,4-cyclohexane dicarboxylic acid. The resulting acid functional modified alkyd may be reacted in its aqueous medium with one or more bases such as tertiary amines to form ionizable quaternary ammonium salts, the resulting materials being readily dispersed or dissolved in the aqueous medium.

In another embodiment, the invention relates to a method for producing a modified base alkyd useful in the formulation of coating compositions. The method comprises reacting with a hydroxyl functional base alkyd preferably having a hydroxyl number of at least 20 a sufficient amount of a polybasic acid composition comprising one or more cycloaliphatic polybasic acids to provide the resulting reaction product with an acid number in the range of 25–100, more preferably 30–50, and most preferably 35–40, and with pendent groups that are carboxyl-functional monoesters of the one or more cycloaliphatic polybasic acids.

The modified alkyd coating compositions of the invention display superior resistance to hydrolysis.

DESCRIPTION OF THE PREFERRED EMBODIMENT

Figure 1:
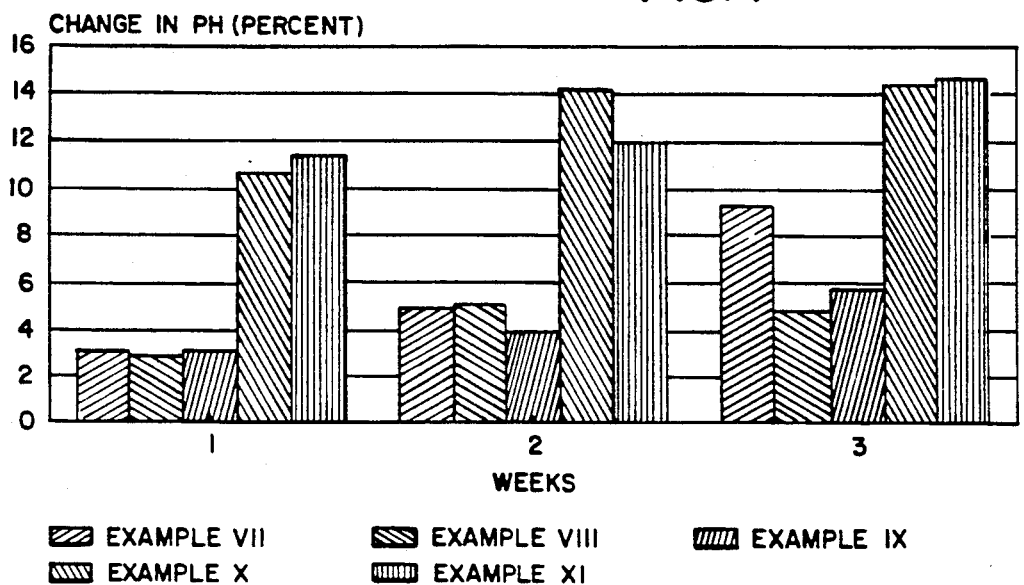
FIG. 1 is a comparative graphical representation of the change in pH of various pigmented coating systems over a three-week period.

Base alkyds that are useful in the manufacture of coating compositions are well known, and reference is made particularly to U.S. Pat. No. 4,511692, the teachings of which are incorporated herein by reference. Base alkyds in general are derived from the reaction of polyols with polybasic acids, diacids and monoacids, including fatty acids. The fatty acids which are employed provide base alkyds with a measure of unsaturation, enabling them to undergo copolymerization with ethylenically unsaturated monomers and to ensure satisfactory oxidative cure.

In the manufacture of the base alkyd, fatty acids having some unsaturation (exhibiting an iodine value of at least about 25), may be combined with one or more polyhydric alcohols, one or more polybasic acids, and, optionally, a non-fatty monoacid in a reaction vessel under an inert atmosphere. Other monoacids can be included as is known in the art, and the presently preferred non-fatty monoacid is benzoic acid.

Polyhydric alcohols useful in preparation of the base alkyd include those having at least two carbon atoms per molecule and also having two to six hydroxyl groups per molecule. Examples include glycerin, pentaerythritol, trimethylolpropane, trimethylpentane diol, cyclohexanedimethylol, trimethylolethane, dipentaerythritol, ethylene glycol, propylene glycol, 1,3-butylene glycol, neopentyl glycol, hydrogenated bisphenol A, 2,2-dimethyl-3-hydroxypropyl-2,2-dimethyl-3-hydroxy propionate, dimethylolpropionic acid and the like. Preferred polyhydric alcohols include pentaerythritol, trimethylolpropane, cyclohexanedimethylol and trimethylolethane.

Preferred fatty monobasic acids which have a high linoleic acid content include high purity tall oil fatty acids and soy bean fatty acids.

Suitable polybasic acids used in the formulation of base alkyds include saturated and aromatically unsaturated acids and anhydrides having at least two carboxyl groups per molecule. Examples include malonic, glutaric, pimelic, suberic, azelaic, sebacic, succinic, adipic, o-phthalic, isophthalic, terephthalic, and hexahydrophthalic acids, trimellitic anhydride, 3,3',4,4'-benzophenone tetracarboxylic acid dianhydride and dimerized fatty acids. Desirably, from about 5% to about 60% by weight of base alkyds of the invention are derived from polybasic acids, from about 5% to about 60% is derived from polyhydric alcohols, from about 10% to about 90% is derived from monobasic fatty acids, and, optionally, from about 0% to about 50% is derived from non-fatty monoacids.

The base alkyd manufacturing process commonly involves blending together the ingredients referred to above and reacting the same at a temperature up to about 460° F. to an acid value of less than about 25 and preferably not greater than 10, following which the reaction mixture is cooled and an appropriate solvent may be added to control viscosity.

Thus, the base alkyds employed in the present invention are the hydroxyl-functional reaction products of one or more polyols, one or more unsaturated fatty acids, and, optionally, one or more polybasic acids. To perform properly in the instant invention, the base alkyd should have a hydroxyl number of at least 20, preferably in the range of 35 to 200, and most preferably in the range of 40 to 100. Acid and hydroxyl numbers as used herein are common parameters used in the field, and may be measured, for example by the methods reported in ASTM D 1639-83 and ASTM D 1957-86, respectively.

The polybasic acid composition with which the base alkyd is reacted in accordance with the present invention may include various aliphatic and aromatic polybasic acids such as adipic acid, terephthalic acid, trimelletic anhydride, isophthalic acid and phthalic anhydride. It is characterized by including one or more cycloaliphatic polycarboxylic acids. Of these, the cyclopentane and cyclohexane polycarboxylic (preferably dicarboxylic) acids are preferred. 1,4-Cyclohexane dicarboxylic acid is most preferred. Cycloaliphatic dicarboxylic acids include the preferred 1,4-cyclohexane dicarboxylic acid as well as 1,3-cyclohexane dicarboxylic acid, 1,3-cyclopentane dicarboxylic acid, 1,2-cyclohexane dicarboxylic acid and 1,2-cyclopentane dicarboxylic acid.

In general, the cyclohexane polycarboxylic acids and cyclopentane dicarboxylic acids of the invention may be of the respective formulas:

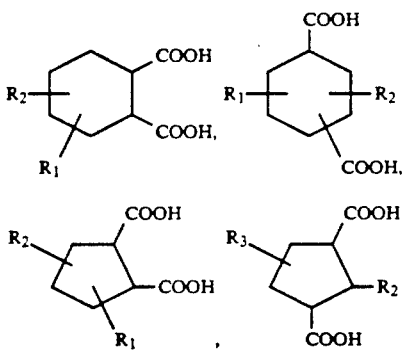

in which $R_1$ may be carboxyl, hydrogen, $C_1$-$C_6$ lower alkyl, and $R_2$ and $R_3$ independently may be hydrogen or $C_1$-$C_6$ lower alkyl. Examples of cycloaliphatic polycarboxylic acids in addition to those described above include 1,4-dicarboxy-3-methyl cyclohexane, 1,4-dicarboxy-3-ethyl cyclohexane, 1,3-dicarboxy-5-methyl cyclohexane, 1,3-dicarboxy-4-methyl cyclohexane, 1,2-dicarboxy-3-methyl cyclohexane, 1,2-carboxy-3-methyl cyclopentane, 1,2-carboxy-4-methyl cyclohexane, 1,3-dicarboxy-2-methyl cyclopentane, 1,3-dicarboxy-4-ethyl cyclopentane and 1,3-dicarboxy-5-methyl cyclopentane.

the one or more cycloaliphatic polycarboxylic acid components of the polybasic acid composition desirably account for at least half, preferably at least 75%, and most preferably from 90%-100% of the acid equivalents provided by the polybasic acid composition. Further, the cycloaliphatic polycarboxylic acid components provide at least half, preferably 75%, and most preferably 90%-100% of the free (that is, pendent) carboxyl groups of the modified alkyd polymer. The major ingredient of the polybasic acid composition desirably is 1,4-cyclohexane dicarboxylic acid. By "major ingredient" is meant that ingredient which is present in the greatest quantity by weight. Preferably at least half and most preferably all of the acid equivalents of the polybasic acid composition are provided by 1,4-cyclohexane dicarboxylic acid.

The polybasic acid composition is provided in a quantity sufficient to react with the hydroxyl functionality of the base alkyd to provide the resulting modified alkyd with an acid number in the range of 25-100, more preferably 30-50, and most preferably 35-40. The modified alkyd desirably retains some hydroxyl functionality, however. The polybasic acid composition is reacted with the base alkyd at a temperature favoring the esterification reaction between carboxyl groups of the polybasic acid composition and hydroxyl functionality of the base alkyd to provide the alkyd with pendent groups which are carboxyl-functional monoesters of the cycloaliphatic polycarboxylic acid components. Reaction temperatures in the range of about 180° C. to about 250° C. are desired, and a temperature range of 230° C. to 240° C. is preferred.

The modified alkyd of the invention desirably is made as a subsequent step in the process of manufacturing a base alkyd. For example, a base alkyd may be produced by reacting a polybasic acid such as isophthalic acid, a polyol such as trimethylolethane and a fatty acid such as tall oil fatty acid in an appropriate reaction vessel in the presence of a catalyst such as dibutyl tin oxide. Once the desired viscosity and hydroxyl number are attained, the polybasic acid composition may be added and reacted with the reaction mixture. The reaction between the base alkyd and the polybasic acid occurs at an initial temperature of not greater than about 180° C. The polybasic cycloaliphatic acid is added at temperatures below 180° C. and heated to the temperature reaction range of 230° C. to 240° C. to facilitate water removal and reduce foaming. The reaction may proceed without catalysts, or may use catalysts such as dibutyl tin oxide that are commonly used in trans-esterification processes. The viscosity and acid number of the reaction mixture may be followed by periodic removal of small samples. Once the desired acid number is attained, the mixture may be cooled, preferably below about 140° C. The product, which at elevated temperatures may be syrupy liquid, may be reduced with such solvents as the butyl ether of ethylene glycol, secondary butyl alcohol and the like. The resulting resin may be solubilized in water by the neutralization of the free acid groups of the alkyd polymer resin with an amine such as triethylamine or with ammonium hydroxide, as typified in the illustrative examples provided below.

In a less preferable procedure, the polybasic acid composition may be included in the base alkyd precursors, but in this event, the polybasic acid should consist essentially of the cycloaliphatic polybasic acids and the precursors should be substantially free of polybasic acids that are not cycloaliphatic, all for the purpose of insuring that the resultant alkyd will have pendent groups that are monoesters of the cycloaliphatic polybasic acids. In this less preferable system, a portion of the cycloaliphatic polybasic acid composition may react with two or more polyols and hence become an internal part of the base alkyd resin, and the remainder of the cycloaliphatic polybasic acid composition may react once with hydroxyl groups of the forming base alkyd to provide the pendent monoester groups referred to above and to provide the thus modified alkyd with an acid number in the range of 25-100.

The invention may be more readily understood by reference to the following illustrative, non-limiting examples:

EXAMPLE I

A. Preparation of Base Alkyd

To a five-liter round bottom three neck flask equipped with an agitator, thermometer, nitrogen inlet, condenser and dean stark trap was added 764.1 grams (4.60 mols.) of isophthalic acid, 818 grams (6.79 mols.) of trimethylolethane, 939.4 grams (3.40 mols.) of tall oil fatty acid, 596.4 grams (4.88 mols.) of benzoic acid, 1.0 grams dibutyl tin oxide and 31.0 grams of cyclohexanone. The reaction mixture was heated to 230° C. with nitrogen sparge, medium agitation and removal of water unit an acid number between 6 and 8 was obtained. The viscosity (Gardner-Holdt) of the resulting base alkyd at 60% solids in xylene was between A and C.

B. Production of Modified Alkyd

The base alkyd composition was then cooled in the reaction flask to 150°-160° C., following which 382.2 grams (2.04 mols.) of 1,4-cyclohexane dicarboxylic acid (Eastman Chemical) containing 8.2% water was added. The mixture was heated again to 230° C. and was maintained at that temperature with removal of water until and acid number of 35-40 was obtained. The viscosity (Gardner-Holdt) of the modified alkyd product was between O and Q as measured at 60% solids in xylene. The batch was then cooled below 140° C. and reduced to 75% solids through the addition of a 1:1 mixture of propyl propasol (Union Carbide) and secondary butyl alcohol.

EXAMPLE II

A. Base Alkyd Preparation

To a two-liter three neck round bottom flask equipped with agitator, thermometer, condenser, dean stark trap, packed column trap and nitrogen inlet was added 244.3 grams (1.47 mols.) of isophthalic acid, 149.4 grams (1.24 mols.) of trimethylolethane, 252 grams (0.90 mols.) of tall oil fatty acid, 83.4 grams (0.66 mol.) benzoic acid, 72.8 grams (0.70 mol.) neopentyl glycol, 1.0 gram of dibutyl tin oxide, and 27.4 grams of cyclohexanone. The mixture was heated to 230° C. with nitrogen sparge and medium agitation and was held at this temperature during water removal unit an acid number of 6-8 was obtained. The Gardner-Holdt viscosity of the base alkyd (measure at 60% solids in xylene) was between A and C.

B. Modified Alkyd Preparation

The base alkyd composition was then cooled in the reaction flask to 150°-160° C., following which 99.3 grams (0.53 mols.) of 1,4-cyclohexane dicarboxylic acid containing 8.2% of water was added. The mixture was heated to 230° C. and was maintained at this temperature with removal of water until an acid number of 35-40 was obtained. The Garden-Holdt viscosity at 60% solids in xylene of the resulting modified alkyd resin was between I and K. The resin was then cooled below 140° C. and was reduced to 75% solids with a 1:1 mixture of propyl propasol and secondary butyl alcohol.

EXAMPLE III

A. Base Alkyd Preparation

To a two-liter flask equipped as in Example I was added 217.7 grams (1.31 mols.) of isophthalic acid, 149.4 grams (1.24 mols.) of trimethylolethane, 268.8 grams (0.96 mols.) of tall oil fatty acid, 85.5 grams (0.70 mols.) of benzoic acid, 168 grams (0.70 mols.) of hydrogenated bisphenol A, 1.0 gram dibutyl tin oxide and 30.6 grams of cyclohexanone. The reaction mixture was heated to 230° C. and held at that temperature with nitrogen sparge and medium agitation until an acid number of 6-8 was obtained. The viscosity of the base alkyd resin at 60% solids in xylene was between A and C (Gardner-Holdt). The reaction mixture was cooled to 150°-160° C.

B. Modified Alkyd Preparation

The base alkyd resin composition was then cooled in the reaction flask to 150°-160° C., following which 99.8 grams (0.58 moles) of 1,4-cyclohexane dicarboxylic acid containing less than 2% of water was added. The mixture was heated to 230° C. and was maintained at that temperature with water removal until an acid number of 35-40 was obtained. The viscosity of the resulting alkyd (Gardner-Holdt, 60% solids in xylene) was I. The product was then cooled to below 140° C. and was reduced to 75% solids with a 1:1 weight ratio of propyl propasol and secondary butyl alcohol.

EXAMPLE IV

A. Base Alkyd Preparation

To a three-liter reaction flask equipped as in Example II was added 234.1 grams (1.41 mols.) of isophthalic acid, 191.6 grams (1.59 mols.) of trimethylolethane, 252.0 grams (0.90 mols.) of tall oil fatty acid, 123.3 grams (1.01 mols.) benzoic acid, 36.4 grams (0.35 mols.) of neopentyl glycol, and 1.0 gram dibutyl tin oxide in 27 grams of cyclohexanone as the reflux solvent. The reaction mixture was heated at 230° C. with nitrogen sparge and medium agitation and was held at that temperature with water removal until an acid number of 6-8 was obtained. At this point, the base alkyd resin exhibited a Gardner-Holdt viscosity of between C and E (60% solids in xylene). The resin was then cooled to 150°-160° C.

B. Modified Alkyd Preparation

To the base alkyd resin was added 99.3 grams of 1,4-cyclohexane dicarboxylic acid containing 8.2% of water. The reaction mixture was heated to 230° C. and held at that temperature with removal of water until an acid number of 35-40 was obtained. At this point, the Gardner-Holdt viscosity of the resin at 69% solids in xylene was between N and P. The modified alkyd was cooled below 140° C. and reduced to 75% solids by the addition of a 1:1 weight ratio of propyl propasol and secondary butyl alcohol.

Examples V and VI are similar to Examples I-III which show the substitution of trimellitic anhydride for 1,4-cyclohexane dicarboxylic acid.

EXAMPLE V

A. Base Alkyd Preparation

To a three liter three neck flask equipped as in Example I was added 237.4 grams (1.43 mols.) of isophthalic acid, 219.8 grams (1.64 mols.) of trimethylolpropane, 60 grams (0.25 mols.) of hydrogenated bisphenol A, 282.8 grams (1.01 mols.) of tall oil fatty acid, 91.5 grams (0.75 mols.) of benzoic acid, 1.0 gram of dibutyl tin oxide and 29.4 grams of cyclohexanone. The reaction mixture was heated to 230° C. with nitrogen sparge and medium agitation and was maintained at this temperature with water removal until an acid number of 6–8 was obtained. At this point, the viscosity of the mixture was between C and E (Gardner-Holdt, 60% solids in xylene). The base alkyd was then cooled to 150°–160° C.

B. Modified Alkyd Preparation

To the base alkyd thus prepared was added 57.6 grams (0.30 mols.) of trimellitic anhydride. The reaction mixture was heated to 190° C. and was held at that temperature with water removal until an acid number of 35–40 was obtained, at which point the Gardner-Holdt viscosity of the resin (at 60% solids in xylene) was between T and U. The modified alkyd was cooled below 140° C. and reduced to 75% solids by addition of a 1:1 mixture of propyl parasol and secondary butyl alcohol.

EXAMPLE VI

A. Base Alkyd Preparation

To a five-liter round bottom three neck flask equipped as in Example II was added 937.3 grams (5.65 mols.) of isophthalic acid, 537.6 grams (4.01 mols.) of trimethylolpropane, 1123.5 grams (4.01 mols.) of tall oil fatty acid, 208.6 grams (1.97 mols.) of neopentyl glycol, 481.2 grams (2.01 mols.) hydrogenated bisphenol A, 3.5 grams dibutyl tin oxide and 108 grams of cyclohexanone. The reaction mixture was heated to 230° C. with nitrogen sparge and medium agitation, and was held at this temperature with water removal until an acid number of 6–8 was obtained, at which point the viscosity of the resin measured between A and C (Gardner-Holdt, 60% solids in xylene). The batch was then cooled below 140° C.

B. Modified Alkyd Preparation

To the resulting base alkyd was added 211.8 grams (6.05 mols.) of trimellitic anhydride, and the mixture was heated to 190° C. and held at that temperature with water removal until an acid number of 35–40 was achieved. At this point, the viscosity of the resin measured between T and U (Gardner-Holdt, 60% solids in xylene). The batch was cooled below 140° C. and was reduced to 75% solids by addition of a 1:1 mixture of propyl parasol and secondary butyl alcohol.

EXAMPLES VII–XI

Pigmented air dried enamels were prepared from the modified alkyds of Examples I, II, III, V and VI, respectively. Grind paste and let down portions of each enamel were prepared by blending ingredients as follows:

| Ingredient | Parts By Weight |
|---|---|
| Grind Paste: | |
| Modified alkyd of Examples I–VI at 75% solids | 100 |
| Wetting agent ("Disperbyk", a product of Byk Chemie) | 2.4 |
| Defoaming agent (Patcote 577, a product of C. J. Patterson Co.) | 1.5 |
| Titanium dioxide pigment (R-902, a product of du Pont) | 243.8 |
| Triethylamine | 5 |
| Water | 125 |
| Let Down: | |
| Modified alkyd of Examples I–VI, at 75% solids | 225 |
| Triethylamine | 3.1 |
| 26% aqueous ammonia | 5.5 |
| Cobalt drying agent (Co Hydrocure, a product of Mooney Chemicals, Inc.) | 2.5 |
| Manganese drying agent (Mn Hydrocure, a product of Mooney Chemicals, Inc.) | 2.5 |
| Curing agent (Activ-8, a product of Vanderbilt Chemical | 2.5 |
| Flow leveling agent (silicone L-5310, Union Carbide, 30% in Butyl Cellosolve EB) | 1.4 |

Each enamel was prepared as follows:

The grind paste was prepared in each example by the addition of the grind paste ingredients together with ¾ cups of sand to a two-quart stainless steel beaker and mixing under high agitation for 15 minutes. The let down ingredients were then added sequentially as listed above under low agitation, and agitation was continued for 5 minutes. The resulting paint was then filtered through a 325 mesh screen to remove the sand, and was adjusted to a pH of approximately 8.5 by addition of a 1:1 weight blend of triethylamine and 26% ammonium hydroxide. The paints were adjusted to a final desired viscosity of between 15 and 30 seconds (Ford No. 4 cup) by the addition of deionized water, as follows:

| | EX. VII | EX. VIII | EX. IX | EX. X | EX. XI |
|---|---|---|---|---|---|
| Deionized water added, parts | 601 | 441 | 401 | 350 | 356.6 |
| Percent solids | 37.3 | 43.6 | 48.2 | 46.1 | 46.1 |
| pH | 8.40 | 8.40 | 8.47 | 8.45 | 8.57 |
| Viscosity, seconds | 30 | 24.8 | 15.5 | 30.4 | 23 |

Examples X and XI, employing modified alkyds prepared without cycloaliphatic polybasic acids, are provided as comparative examples.

EXAMPLES XII–XVI

Un pigmented coating compositions referred to below as Examples XII, XIII, XIV, XV and XVI were prepared from each of the modified alkyds of Examples I, II, IV, V and VI respectively, as follows, Examples XV and XVI representing the modified alkyds prepared without cycloaliphatic polybasic acids and hence serving as comparative examples:

50 Grams of the modified alkyd resin at 75% solids as produced in the examples was mixed with 12.5 grams of butyl cellosolve (Union Carbide). The resulting solution is then reduced to a viscosity of 35–68 seconds (Ford #4 Cup) and a solids concentration of 20–24% by the addition of deionized water. The final pH of the resin solution is adjusted to 9.0–9.7 by addition of either triethylamine or 26% ammonium hydroxide to aliquots of the resin of each example. The ingredients are mixed under medium agitation for 15 minutes.

TESTING

Figure 2:
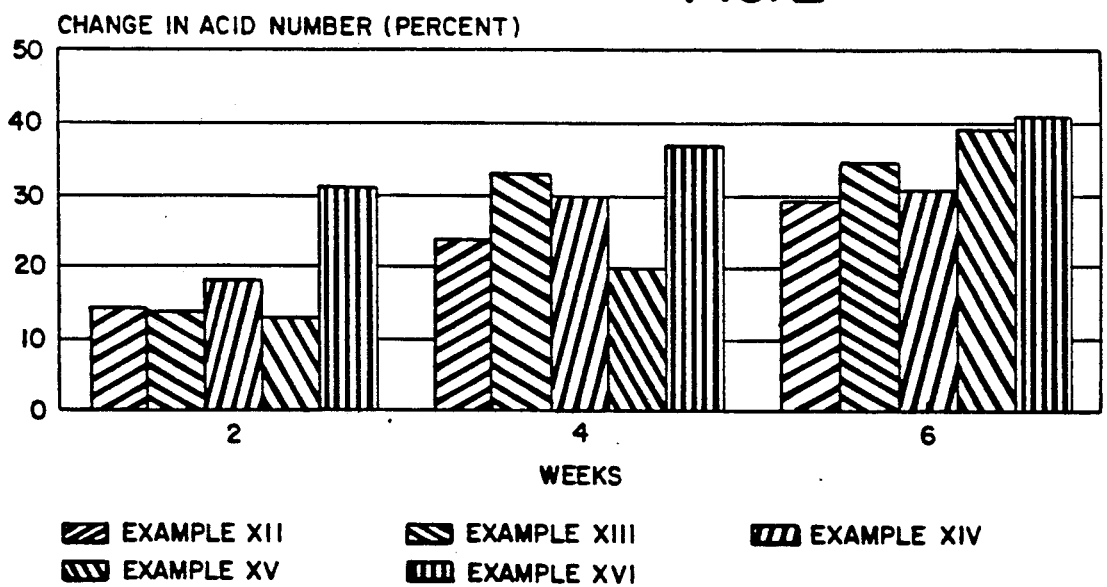
FIG. 2 is a comparative graphical representation of the change in acid number of various $NH_4OH$-adjusted unpigmented systems of the invention.
Figure 3:
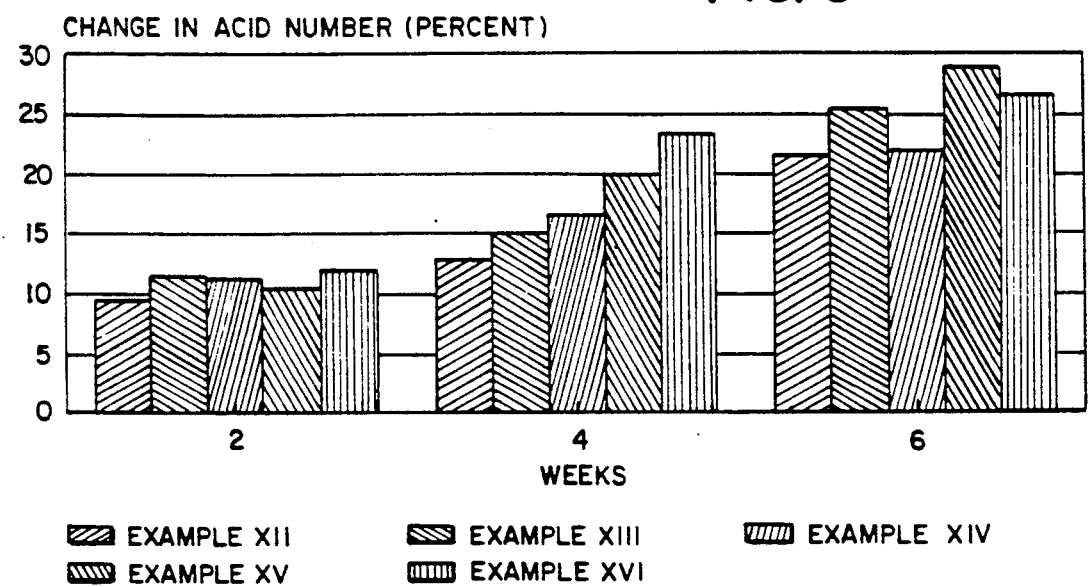
FIG. 3 is a comparative graphical representation of the change in acid number of various triethylamine-adjusted unpigmented systems of the invention.

Each of the coating compositions was placed in an oven at 130° F. for a period of at least three weeks. Other samples of the pigmented Examples VII-XII were stored at room temperature for the same period. Changes in pH (for the pigmented systems) and acid number (for the unpigmented systems) were noted periodically, decreases in pH and increases in acid number signaling the occurrence of hydrolysis. Testing of this type is reported in Payne, K. L., Jones, F. N., and Bradenburger, L. W., *Hydrolytic Stability of Oligoesters in Simulated Water-Reducible Coating Formulations*, Journal of Coatings Technology Vol. 57, No. 723, April, 1985, the teachings of which are incorporated herein by reference. The results are reported in the following tables and are presented graphically in FIG. 1-3.

TABLE 1

| pH | Pigmented Coatings | | | | |
|---|---|---|---|---|---|
| | Example VII | Example VIII | Example IX | Example X | Example XI |
| Initial | 8.66 | 8.40 | 8.47 | 8.45 | 8.58 |
| 1 Week | 8.39 | 8.16 | 8.21 | 7.55 | 7.60 |
| 2 Weeks | 8.23 | 7.98 | 8.13 | 7.25 | 7.56 |
| 3 Weeks | 7.85 | 7.99 | 7.98 | 7.23 | 7.32 |
| % Change | | | | | |
| 1 Week | 3.11 | 2.86 | 3.07 | 10.65 | 11.42 |
| 2 Weeks | 4.96 | 5.00 | 4.01 | 14.20 | 11.88 |
| 3 Weeks | 9.35 | 4.88 | 5.78 | 14.44 | 14.68 |

TABLE 2

| Acid No. | Unpigmented Coatings, NH4OH Adjusted | | | | |
|---|---|---|---|---|---|
| | Example XII | Example XIII | Example XIV | Example XV | Example XVI |
| Initial | 46.4 | 41.6 | 40.3 | 41.0 | 35.2 |
| 2 Weeks | 53.1 | 47.4 | 47.6 | 46.3 | 46.2 |
| 4 Weeks | 57.6 | 55.4 | 52.3 | 49.2 | 48.2 |
| 6 Weeks | 60.1 | 56.1 | 52.8 | 57.1 | 49.6 |
| % Change | | | | | |
| 2 Weeks | 14.43 | 13.94 | 18.1 | 12.92 | 31.25 |
| 4 Weeks | 24.1 | 33.17 | 29.77 | 20.00 | 36.93 |
| 6 Weeks | 29.52 | 34.85 | 31.01 | 39.26 | 40.90 |

TABLE 3

| Acid No. | Unpigmented Coatings, Triethylamine Adjusted | | | | |
|---|---|---|---|---|---|
| | Example XII | Example XIII | Example XIV | Example XV | Example XVI |
| Initial | 46.6 | 41.6 | 40.6 | 41.5 | 36.5 |
| 2 Weeks | 51.1 | 46.4 | 45.2 | 45.9 | 40.9 |
| 4 Weeks | 52.6 | 49.0 | 47.2 | 49.8 | 45.0 |
| 6 Weeks | 56.7 | 52.2 | 49.5 | 53.5 | 46.2 |
| % Change | | | | | |
| 2 Weeks | 9.66 | 11.53 | 11.33 | 10.66 | 12.05 |
| 4 Weeks | 12.87 | 15.10 | 16.26 | 20.00 | 23.28 |
| 6 Weeks | 21.67 | 24.48 | 21.92 | 28.91 | 26.57 |

While a preferred embodiment of the present invention has been described, it should be understood that various changes, adaptations and modifications may be made therein without departing from the spirit of the invention and the scope of the appended claims.

What is claimed is:

1. A coating composition comprising, in aqueous medium, a modified alkyd resin which is the reaction product of a hydroxyl-functional base alkyd with a sufficient amount of a polybasic acid composition at least half of the carboxyl equivalents of which are provided by one or more cycloaliphatic polycarboxylic acids selected from the group consisting of cyclohexane polycarboxylic acids and cyclopentane dicarboxylic acids to provide the modified alkyd with an acid number in the range of 25 to 100, the modified alkyd having pendent groups which are carboxyl-functional monoesters of said cycloaliphatic carboxylic acids.

2. The coating composition of claim 1 wherein said polybasic acid composition comprises, as it major ingredient, 1,4-cyclohexane dicarboxylic acid.

3. The coating composition of claim 2 including in said aqueous medium an amine base reactive with acid functionality of the modified alkyd to from an ionizable resin in the aqueous medium.

4. The coating composition of claim 1 wherein at least 75% of the carboxyl equivalents of the polybasic acid composition are provided by said one or more cycloaliphatic polycarboxylic acids.

5. The coating composition of claim 1 wherein said modified alkyd has an acid number in the range of 30-50.

6. An air-drying, water-reducible, hydrolysis-resistant coating composition comprising, in aqueous medium, a modified alkyd which is the reaction product of a base alkyd having a hydroxyl number of at least 20 with a cycloaliphatic polybasic acid composition having as its major ingredient 1,4-cyclohexyl dicarboxylic acid to provide said modified alkyd with an acid number in the range of 25 to 100.

7. The coating composition of claim 6 wherein said modified alkyd has an acid number in the range of 30-50.

8. The coating composition of claim 6 including in said aqueous medium an amine base reactive with acid functionality of the modified alkyd to from an ionizable resin in the aqueous medium.

9. A modified alkyd useable in the formulation of coating compositions, comprising the reaction product of a hydroxy-functional base alkyd with a sufficient amount of a polybasic acid composition at least half of the carboxyl equivalents of which are provided by a cycloaliphatic polycarboxylic acid composition which comprises as its major ingredient 1,4-cyclohexane dicarboxylic acid to provide the modified alkyd with an acid number in the range of 25 to 100, the modified alkyd having pendent groups that are carboxyl-functional monoesters of said cycloaliphatic polycarboxylic acid.

10. The modified alkyd of claim 9 wherein at least 75% of the carboxyl equivalents of the polybasic acid composition are provided by said cycloaliphatic polycarboxylic acid composition.

11. The modified alkyd of claim 9 wherein said acid number is in the range of 30-50.

12. Method of producing a modified base alkyd useful in the formulation of coating compositions comprising reacting a hydroxyl-functional base alkyd with a sufficient amount of a polybasic acid composition comprising one or more cycloaliphatic polycarboxylic acids selected from the group consisting of cyclohexane polycarboxylic acids and cyclopentane dicarboxylic acids which contribute at least half of the carboxyl equivalents of the polybasic acid composition to provide the resulting modified alkyd with an acid number in the range of 25 to 100.

13. The method of claim 12 in which sufficient polybasic acid composition is employed to provide the modified alkyd with an acid number in the range of 30-50.

14. Method of producing a modified base alkyd useful in the formulation of coating compositions, comprising reacting hydroxyl groups of a base alkyd having a hydroxyl number of at least 20 with 1,4-cyclohexane dicarboxylic acid to provide the resulting modified alkyd with an acid number in the range of 24–100 and with pendent groups that are carboxyl-functional monoesters of 1,4-cyclohexane dicarboxylic acid.

15. Method of producing a modified base alkyd useful in the formulation of coating compositions comprising esterifying hydroxyl groups of a hydroxyl-functional base alkyd during or after its preparation with a cycloaliphatic polybasic acid composition having, as its major ingredient 1,4-cyclohexane dicarboxylic acid to provide the resulting modified alkyd with an acid number in the range of 25 to 100 and with pendent groups that are carboxyl-functional monoesters of said cycloaliphatic polycarboxylic acid composition.

* * * * *